US011493409B2

(12) United States Patent
Hargrove (10) Patent No.: US 11,493,409 B2
(45) Date of Patent: Nov. 8, 2022

(54) FIELD SAMPLING SYSTEM AND METHOD OF USING

(71) Applicant: James McChesney Hargrove, Highland Park, IL (US)

(72) Inventor: James McChesney Hargrove, Highland Park, IL (US)

(73) Assignee: ALTI LLC, Highland Park, IL (US)

( * ) Notice: Subject to any disclaimer, the term of this patent is extended or adjusted under 35 U.S.C. 154(b) by 44 days.

(21) Appl. No.: 17/115,723

(22) Filed: Dec. 8, 2020

(65) Prior Publication Data

US 2021/0190645 A1 Jun. 24, 2021

Related U.S. Application Data

(60) Provisional application No. 62/945,212, filed on Dec. 8, 2019, provisional application No. 62/945,207, filed on Dec. 8, 2019.

(51) Int. Cl.
*G01N 1/22* (2006.01)
*G01N 1/24* (2006.01)
(Continued)

(52) U.S. Cl.
CPC ............. *G01N 1/2205* (2013.01); *G01N 1/14* (2013.01); *G01N 1/2035* (2013.01); *G01N 1/24* (2013.01);
(Continued)

(58) Field of Classification Search
CPC ................... G01N 1/2205; G01N 1/24; G01N 2001/2223; G01N 1/14; G01N 1/2035
(Continued)

(56) References Cited

U.S. PATENT DOCUMENTS 4,677,863 A * 7/1987 Gay ..................... G01N 1/2205
55/327
5,912,740 A * 6/1999 Zare ....................... G01N 21/39
356/440
(Continued)

FOREIGN PATENT DOCUMENTS

CN 102192880 A * 9/2011 ................ G01J 3/42
CN 208297202 U 12/2018
(Continued)

OTHER PUBLICATIONS

Takashi Nagoka et al. Double Cold Trap Method to Determine the Concentrations of Volatile Organic Compounds in Human Expired Gas, Advanced Biomedical Engineering, Feb. 3, 2015, pp. 112-118 (Year: 2015).*

(Continued)

*Primary Examiner* — Clayton E. LaBalle
*Assistant Examiner* — Kevin C Butler
(74) *Attorney, Agent, or Firm* — Loza & Loza, LLP; Heidi L. Eisenhut (57) ABSTRACT

A sampling device comprising a filter to remove particulates greater than about 10 microns, a dryer active to remove water vapor present in the air sample, a chemical scrubber active to remove contaminants from the air sample, a cold trap to capture analytes which is configurable to be put into fluid communication with a spectroscopic analyzer. A method of obtaining and analyzing a sample utilizing the device is also disclosed.

17 Claims, 6 Drawing Sheets

(51) Int. Cl.
*G01N 1/20* (2006.01)
*G01N 1/14* (2006.01)

(52) U.S. Cl.
CPC ............... *G01N 2001/2223* (2013.01); *G01N 2001/2282* (2013.01)

(58) Field of Classification Search
USPC ...................................................... 73/863.23
See application file for complete search history.

(56) References Cited

U.S. PATENT DOCUMENTS

| | | | | |
|---|---|---|---|---|
| 5,929,981 | A * | 7/1999 | Keilbach | G01N 21/15 356/73 |
| 6,466,322 | B1 * | 10/2002 | Paldus | G01N 21/39 356/437 |
| 6,865,198 | B2 * | 3/2005 | Taubman | G01J 3/42 372/29.016 |
| 7,106,763 | B2 * | 9/2006 | Tan | G01N 21/39 372/9 |
| 7,145,165 | B2 * | 12/2006 | Cox | G01N 21/05 356/442 |
| 7,154,595 | B2 * | 12/2006 | Paldus | G01N 21/39 356/73 |
| 7,541,586 | B2 * | 6/2009 | Miller | G01N 21/39 250/341.1 |
| 7,541,589 | B2 * | 6/2009 | Srivastava | C09K 11/7772 250/361 R |
| 7,649,189 | B2 * | 1/2010 | Cole | G01N 21/031 250/576 |
| 7,656,532 | B2 * | 2/2010 | Cole | G01N 21/39 356/435 |
| 7,663,756 | B2 * | 2/2010 | Cole | G01N 21/1702 250/576 |
| 7,810,376 | B2 * | 10/2010 | Koulikov | G01N 1/405 73/23.31 |
| 8,846,407 | B2 * | 9/2014 | Hargrove | G01N 21/31 436/118 |
| 9,789,434 | B1 * | 10/2017 | Lai | B01D 53/025 |
| 10,161,835 | B1 * | 12/2018 | Moorman | G01N 1/2273 |
| 2006/0232779 | A1 * | 10/2006 | Shaw | G01J 3/42 356/436 |
| 2007/0023627 | A1 * | 2/2007 | Finch | G01N 1/2214 250/288 |
| 2008/0111993 | A1 * | 5/2008 | Miller | G01N 21/39 356/437 |
| 2009/0185175 | A1 * | 7/2009 | Cole | G01N 21/03 356/213 |
| 2010/0236341 | A1 * | 9/2010 | Martin | G01N 1/405 73/863.11 |
| 2011/0199611 | A1 * | 8/2011 | Cole | G01J 3/42 356/437 |
| 2012/0242997 | A1 * | 9/2012 | He | G01J 3/28 356/402 |
| 2013/0017618 | A1 * | 1/2013 | Hargrove | G01N 33/227 436/117 |
| 2015/0131094 | A1 * | 5/2015 | Alquaity | G01N 21/39 356/326 |
| 2019/0072534 | A1 * | 3/2019 | Simon | G01N 35/085 |
| 2021/0172870 | A1 * | 6/2021 | Schmidt-Kaeding | G01J 3/0205 |
| 2021/0172920 | A1 * | 6/2021 | Hargrove | G01N 21/33 |
| 2021/0190645 | A1 * | 6/2021 | Hargrove | G01N 1/24 |
| 2021/0310936 | A1 * | 10/2021 | Pohlman | G01N 33/0067 |

FOREIGN PATENT DOCUMENTS

| | | | | |
|---|---|---|---|---|
| EP | 2138831 | A1 * | 12/2009 | ............ G01N 21/031 |
| FR | 3063811 | A1 * | 9/2018 | ............ G01J 3/0202 |

OTHER PUBLICATIONS

PCT/US2020/063841. International Search Report & Written Opinion (dated Mar. 29, 2021) pp. 12.

* cited by examiner

Formation of $NO_2$ from Triacetone Triperoxide (TATP)

$(ROOR)_3 \rightarrow 6RO\cdot$ $RO\cdot + R\text{-}H \rightarrow ROH + R\cdot$ $R\cdot + O_2 \rightarrow ROO\cdot$ $ROO\cdot + NO \rightarrow RO\cdot + NO_2$

FIG. 4

Formation of $NO_2$ from Explosives

TNT type: $RNO_2 \rightarrow R\cdot + NO_2$ @285°C

AMFO: $NH_4NO_3 + O_3 \rightarrow 2H_2O + 2NO_2$ @230°C

PETN type: $RONO_2 \rightarrow RO\cdot + NO_2$ @200°C

RDX Type: $RNNO_2 \rightarrow RN\cdot + NO_2$ @200°C

FIELD SAMPLING SYSTEM AND METHOD OF USING

CROSS REFERENCE TO RELATED APPLICATIONS

This application claims the benefit of and priority to provisional patent application U.S. 62/945,212, filed Dec. 8, 2019, and this application claims the benefit of and priority to provisional patent application U.S. 62/945,207, filed Dec. 8, 2019, the contents of each are fully incorporated by reference herein.

BACKGROUND

The instant disclosure generally relates to a sampling system for detecting trace materials in air adaptable for use with a cavity enhanced spectroscopic analyzer and a method of utilizing the sampling system with a cavity enhanced spectroscopic analyzer to determine the presence of various materials in an environment. In particular, a system directed to detection and measurement of trace chemical species or particles in gaseous samples characteristic of explosives, pollutants, and/or the like utilizing a cavity ring down instrument.

An explosive material is a material that contains a great amount of potential energy and which can produce an explosion if the energy is released suddenly, usually accompanied by the production of light, heat, sound, and/or pressure. Examples of explosive compounds include ammonium nitrate, nitroglycerin, acetone peroxide, trinitrotoluene (TNT), nitrocellulose, RDX, PETN, and HMX. Recently, the detection of explosives in venues such as shipping ports, airports and other border entries has become important in view of the risk of terrorist attacks. The detection of explosive compound residues has been attempted with a number of different technologies, including mass spectroscopy, fluorescence detection, and nitric oxide detection. Mass spectroscopy requires expensive and cumbersome equipment that requires frequent maintenance and calibration. Fluorescence detection is not generally sensitive enough for applications involving non-intrusive analysis, and requires that samples be accessible to sampling by wipes and the like, which are then irradiated to detect any residue. Nitrogen monoxide detection has been developed based on the principle that many explosives can be made to generate nitrogen monoxides. Conventional equipment used in these techniques is relatively insensitive, requires frequent calibration and service, and may not detect explosives or the like. There is a need for a robust and facile sampling system and analysis method which can detect explosives and/or other materials at very low levels utilizing ambient sampling techniques.

SUMMARY

In one aspect of the disclosure, a device comprises a sample inlet for receiving an air sample from an ambient environment, in fluid communication with; a first filter dimensioned to remove particulates greater than about 10 microns, from the air sample obtained from the ambient environment, in fluid communication with a dryer active to remove water vapor present in the air sample, in fluid communication with a chemical scrubber active to remove contaminants from the air sample, in fluid communication with a cold trap, maintained at a temperature sufficient to retain analytes present in the air sample prior to a remainder of the air sample being exhausted through a sample outlet to the ambient environment, wherein an outlet of the cold trap is configured to be put into fluid communication with an inlet of a spectroscopic analyzer such that analytes present in the cold trap may be released from the cold trap and analyzed.

In one aspect of the disclosure, a method comprises the steps of (i) collecting an air sample from an ambient environment by directing the air sample from a sample inlet to a sample outlet, the device comprising: the sample inlet in fluid communication with; a first filter dimensioned to remove particulates greater than about 10 microns, from the air sample obtained from the ambient environment, in fluid communication with a dryer active to remove water vapor present in the air sample, in fluid communication with a chemical scrubber active to remove contaminants from the air sample, in fluid communication with a cold trap, maintained at a temperature sufficient to retain analytes present in the air sample prior to a remainder of the air sample being exhausted through a sample outlet to the ambient environment, wherein an outlet of the cold trap is configured to be put into fluid communication with an inlet of a spectroscopic analyzer such that analytes present in the cold trap may be released from the cold trap and analyzed; ii) trapping one or more analytes present in the air sample within the cold trap to form an analysis sample; iii) placing the outlet of the cold trap in fluid communication with the inlet of the spectroscopic analyzer; iv) heating the cold trap to release the analytes from in the cold trap present in the analysis sample; and v) analyzing the analysis sample using the spectroscopic analyzer.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context.

Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

It is to be understood that various embodiments of the present disclosure will be described with reference to the accompanying drawings. Accordingly, those of ordinary skill in the art will recognize that modifications, equivalents, and/or alternatives of the various embodiments described herein can be made without departing from the scope and spirit of the present disclosure. With regard to description of drawings, similar components may be marked by similar reference numerals.

For use herein, the expressions "have", "may have", "include", "comprise", "may include", and "may comprise" indicate the existence of corresponding features (e.g., such as numeric values, functions, operations, or components) but do not exclude the presence of additional features.

In the present disclosure, expressions such as, "A or B", "at least one of A or/and B", and "one or more of A or/and B", may include any and all combinations of one or more of the associated listed items. For example, the terms "A or B", and "at least one of A or B" may refer to the case (1) where A is included, (2) where B is included, or (3) where both A and B are included.

Terms such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing from the scope of the present disclosure, a first element may be referred to as a second element, and similarly, a second element may be referred to as a first element.

It will be understood that when an element (for example, a first element) is referred to as being operatively or communicatively "coupled with/to" or "connected to" another element (for example, a second element), it can be directly coupled with/to or connected to the other element or an intervening element (for example, a third element) may be present.

As used herein, the expression "configured to" used herein may be used interchangeably with, for example, the expression "suitable for", "having the capacity to", "designed to", "adapted to", "made to", or "capable of". The term "configured to (or set to)" does not mean only "specifically designed to" in hardware. Instead, the expression "a device configured to" may mean that the device is "capable of" operating together with another device or other components. For example, an "electronic memory assembly" configured to (or set to) store data for subsequent retrieval, refers to any such memory module or modules, with the associated circuitry, power source, and programming which render it capable of performing the corresponding operation of storage and retrieval utilizing a generic-purpose processor (e.g., a central processing unit (CPU) or an application processor) which may perform corresponding operations by executing one or more software programs which are stored on the memory device.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The controller refers to a controlling system which typically includes a processor and the related circuitry and components, e.g., power source, memory, storage, processors, coprocessors, gates, relays, other integrated circuits, software, and/or the like, necessary for its function. The processor may be responsible for managing general processing, including the execution of software stored on a machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may comprise a computer-readable medium having instructions stored (and/or encoded) thereon, the instructions being executable by one or more processors to perform the operations described herein and be embodied in a computer-program product. The computer-program product may comprise packaging materials to advertise the computer-readable medium therein for purchase by consumers.

Computer readable medium may also include, by way of example, a carrier wave, a transmission line, and any other suitable medium for transmitting software and/or instructions that may be accessed and read by a computer or the processor. The non-transient computer readable medium may reside in the device, external to the device, or distributed across multiple entities including the device. The non-transient computer readable medium may be embodied in a computer program product. By way of example, a computer program product may include a computer readable medium in packaging materials. Those skilled in the art will recognize how best to implement the described functionality presented throughout this disclosure depending on the particular application and the overall design constraints imposed on the overall system.

Within the present disclosure, the word "exemplary" and/or "preferably" are used to mean "serving as an example, instance, or illustration." Any implementation or aspect described herein as "exemplary" and/or "preferably" are is not necessarily to be construed as preferred or advantageous over other aspects of the disclosure in an overall limiting sense, but only in relation to specific embodiments. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The terms used herein are used to describe specific embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning as that generally understood by a person skilled in the art to which the present disclosure pertains. It will be further understood that terms, which are defined in a dictionary and commonly used, should also be interpreted as is customary in the relevant related art and not in an idealized or overly formal manner unless expressly so defined herein. In some cases, even if terms are defined in the specification, they may not be interpreted to exclude embodiments of the present disclosure.

In various embodiments of the present disclosure, the electronic components referred to in embodiments of the device is not limited to currently known devices but may include new electronic devices suitable for the intended purpose which are subsequently produced due to the development of new technologies.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Furthermore, "determining" may include resolving, selecting, choosing, establishing and the like. Likewise, "controlling" encompasses a wide variety of actions, the totality of which results in the functioning of the device for the intended purpose.

The following detailed description is of the best currently contemplated modes of carrying out aspects of the disclosure. The description is not to be taken in a limiting sense, but is made merely for the purpose of illustrating the general principles of the various aspects disclosed herein.

Applicant has discovered that the measurement of nitrogen dioxide ($NO_2$) in ambient air within an environment may be useful to determine the presence and amount of various materials including explosives, narcotics, and the like present within this environment. Analysis may include conversion of analytes to $NO_2$ and/or conversion of $NO_2$ to nitric oxide (NO), either by catalytic thermal decomposition (which suffers from interferences from organic nitrates, HONO, $HNO_3$, and the like) and/or by photolysis (which is relatively immune from interferences), when followed by reaction of NO with $O_3$ to produce electronically excited $NO_2^*$. The excited $NO_2^*$ emits a broad continuum radiation in the region of 500-900 nanometers (nm), with a signal strength that is proportional to the concentration of NO. Subtraction of the background NO concentration then yields the concentration of $NO_2$ in the sample, which may then be utilized to determine a concentration of a particular material or class of materials present in this space.

Chemiluminescence of nitric oxide (NO) by reaction with ozone is used extensively for quantifying NO and nitrogen dioxide ($NO_2$) in industrial smokestack emissions, air quality monitoring stations and medical facilities, but suffers from quenching by water vapor and, at high enough concentrations, from $CO_2$, as well leading to erroneously low readings. An additional problem for $NO_2$ measurements using chemiluminescence is that catalytic thermal decomposition of $NO_2$ to NO for detection together as $NO_x$, where x=1 and/or 2, can lead to high $NO_2$ readings from other nitrogen-containing species, such as acyl peroxynitrates (PANs), alkyl nitrates and ammonia which all produce $NO_2$ upon thermal decomposition. This additional signal has resulted in $NO_N$-analyzers being termed $NO_N$-analyzers because they measure more than the sum of NO and $NO_2$. In the presence of quenching, the analyzers can actually indicate significantly less pollution as well. As a result, accurate measurements of $NO_2$ using the prior art approach of chemiluminescence cannot be reliably obtained.

In embodiments of the instant disclosure, $NO_2$ specific analyzers with low limits of detection are disclosed which utilize an improved cavity ring-down spectroscopy (CRDS) and its derivatives, continuous wave cavity ring-down (cw-CRDS), off-axis cw-CRDS, cavity attenuated phase shift spectroscopy (CAPS), and cavity enhanced absorption spectroscopy (CEAS). Tunable diode laser spectroscopy (TD-LAS) and laser induced fluorescence (LIF) are more established techniques that measure $NO_2$ and could also be combined with chemiluminescence.

However, critical to successful analysis is obtaining air samples, and preparing samples such that they are suitable for cavity ring-down spectroscopic analysis. Furthermore, the ability to obtain such samples under hostile conditions without putting human life in danger is paramount to success. Remote analysis of a plurality of acquired samples is also desirable.

The instant device and methods utilizing these devices provide the needed method for the relatively rapid screening of areas of interest and crowds of people or animals. They are suitable of detection of explosives, drug residues such as fentanyl and the like, and other target compounds. These devices and methods are also suitable for routine monitoring of manufacturing facilities, fertilizer, pesticide or herbicide application to crops, and the like. They are also suitable for monitoring of non nitrogenous applications by inclusion of a nitrogen taggant such as ammonium nitrate and the like.

The remote collection devices according to embodiments disclosed herein allow for separation of the sample collection apparatus from the analyzer in a drone—mother ship arrangement, wherein the sample drones are returned to the mother-ship for analysis. This process may be entirely automated.

Sampling devices according to embodiments disclosed herein are suitable to be carried, mounted on robots, or configured in a swarm of robots to clear a target area, and lend themselves to use of Artificial Intelligence algorithms for route and sampling optimization. In other situations, the sampling drones may further include cutters, pliers or "hypodermic" type needles for use to obtain samples from enclosed spaces.

In one or more embodiments, a device comprises a sample inlet for receiving an air sample in fluid communication with; a first filter dimensioned to remove particulates greater than about 10 microns, preferably greater than about 1 micron, preferably greater than about 0.5 microns from the air sample, in fluid communication with; a dryer active to remove water vapor present in the air sample, in fluid communication with; a chemical scrubber active to remove contaminants from the air sample, in fluid communication with; a cold trap, maintained at a temperature sufficient to precipitate and capture analytes present in the air sample prior to the air sample being exhausted through a sample outlet to the atmosphere.

In embodiments, the device further comprises an air pump, an outlet of the air pump in direct fluid communication with the sample inlet such that the air sample is pumped through the device from the inlet to the outlet. In an alternative embodiment, the device comprises an air pump in which an inlet of the air pump in direct fluid communication with the sample outlet such that the air sample is drawn through the device from the inlet to the outlet.

In one or more embodiments, the sample inlet, the first filter, or both are heated to a temperature sufficient to decompose sources of interference. A coarse filter removes any dust or particles that could also interfere or contaminate the system. Only the smallest particles are needed for analysis, and if they are volatile, after heating, they will pass easier, potentially condensing to smaller droplets automatically in the flow system. In embodiments, the sample inlet, the first filter, or both are heated to a temperature from about 30° C. to about 50° C. to decompose ambient alkyl peroxynitrates (PANs) known to interfere with cavity ring down spectroscopic analysis.

In some embodiments, the dryer comprises a desiccant, a water permeable membrane, a thermal condensation dryer (a cold finger), or a combination thereof, suitable to lower a dew point of the air sample to about −10° C. or lower, but which still allows the analytes to pass through. In some embodiments, the dryer comprises a Nafion dryer or equivalent comprising a closed loop with an inline pump with a cartridge of drying agent to remove water vapor from the sample. An annular tubing allows the sample to go down the Nafion tubing while water vapor permeates to the outer drying tubing. Dyers can often produce water dew points of −10 deg C or lower. Either a chiller or a drying agent, or both can be used to remove water from the outer tubing as it cycles to the pump.

In one or more embodiments, the chemical scrubber comprises a pH basic absorbent or adsorbent, a pH acidic absorbent or adsorbent, a humectant, or a combination thereof sufficient to remove compounds known to interfere with cavity ring down spectroscopic analysis of the air sample. In some embodiments, the chemical scrubber comprises a pH basic absorbent and a humectant, preferably glycerin, present in an amount sufficient to remove nitrogen oxides and ambient nitrates from the air sample, known to interfere with cavity ring down spectroscopic analysis of the air sample. In a preferred embodiment, a pH basic scrubber with a humectant such as glycerin removes nitrogen oxides and other interferences, including ambient nitrates if the amount of scrubber material is not too little or too much. Typically, a 1-3 inch long scrubber created by a quarter to half inch per-fluorinated tube with fittings down to an eighth inch to quarter inch tube will remove interferences without removing target compounds.

In one or more embodiments, the cold trap comprises one or more porous surfaces in thermal communication with a cooling surface which is maintained at a temperature sufficient to sequester thereon analytes present in the air sample.

In a preferred embodiment, the cold trap can comprise a filter, e.g., a 0.45 micron filter, having a membrane on a thermally conductive support, e.g., anodized aluminum, which is cooled by a source of cold, preferably a thermoelectric cooler. In some embodiments, ice water or dry carbon dioxide cooling circulated by a solvent can be used to get colder temperatures. In alternative embodiments, liquid nitrogen or expansion of compressed volatile liquids can also provide sufficient cooling to trap the analytes present in the air sample.

Accordingly, in an embodiment, the cold trap comprises a thermoelectric cooler in thermal communication with a surface in contact with the air sample, and/or the cold trap comprises a surface in physical contact with the air sample and in thermal contact with and ice bath, a solid carbon dioxide bath, liquid nitrogen, or a combination thereof.

In one or more embodiments, at least a portion of the device comprising the trapped analytes (e.g., a frozen filter or a section comprising the trapped analytes) is adapted to be put into fluid communication with an inlet of a cavity ring down spectroscopic analyzer, and wherein the trapped analytes may be released from the device and analyzed.

Accordingly, in embodiments, when the sampling system has returned to the Mothership, a solenoid valve on the sampling system is opened to a corresponding port on the mother ship and the analytes desorbed from the cold trap and directed into an analyzer allowing the mother ship to pull sample through the sampler for thermal desorption and analysis. In some embodiments, the cold trap further comprises, or is adaptable to be placed in contact with a heater, preferably a heater in which the temperature may be controlled to remove trapped analytes from the cold trap according to a thermal profile, similar to vapor phase chromatography, providing a means for separating the analytes according to vapor pressure prior to being directed into an optical cavity of a cavity ring down spectroscopic analyzer for analysis.

In embodiments, the device may further comprise an analyzer suitable for analyzing the trapped analytes removed from the air sample using cavity ring down spectroscopic analysis, selected from a thermal desorption cavity ring down spectrometer (TD-CRDS), a cavity attenuated ring down spectrometer with gated integrated detection (CARDS-GID), a cavity phase shift spectroscopic (CAPS)-based instrument, a cavity enhanced absorption (CEAS) spectroscopic instrument, a laser-induced fluorescence detector (LIF) spectroscopic instrument, a simultaneous gated integrated detection cavity ring down spectrometer (SGID-CRDS), or a combination thereof.

In embodiments, the sample inlet is upstream of the first filter; the first filter is upstream of the dryer; the dryer is upstream of the chemical scrubber, or a combination thereof. The first filter may comprise a plurality of filters, the dryer may comprise a plurality of drying segments, and/or the chemical scrubber may comprise a plurality of sections, each having different chemical scrubbing abilities. For example, a first section may comprise an absorbent having a pH greater than 7 followed by a section having a pH less than 7, and/or the like.

In one or more embodiments, a method comprises the steps of collecting an air sample in a vicinity of an object by directing the air sample through a device according to any one of claims 1 through 15 and trapping one or more analytes present therein; placing a least a portion of the device comprising the trapped analytes into fluid communication with an inlet of a cavity ring down spectroscopic analyzer, and releasing the trapped analytes to form an analysis sample; directing the analysis sample into the analyzer; and analyzing the analysis sample.

In embodiments, the step of releasing the trapped analytes comprises a controlled thermal desorption to produce a plurality of analysis samples characterized by a desorption temperature prior to said analyzing of the analysis samples.

In one or more embodiments, the cavity ring down spectroscopic analyzer comprises a thermal desorption cavity ring down spectrometer (TD-CRDS), a cavity attenuated ring down spectrometer with gated integrated detection (CARDS-GID), a cavity phase shift spectroscopic (CAPS)-based instrument, a cavity enhanced absorption (CEAS) spectroscopic instrument, a laser-induced fluorescence detector (LIF) spectroscopic instrument, a simultaneous gated integrated detection cavity ring down spectrometer (SGID-CRDS), or a combination thereof.

In embodiments, a system may comprise a plurality of sampling devices according to embodiments disclosed herein. Artificial Intelligence can be used to prioritize sampling order. The system may further include one or more Thermal-Decomposition Cavity Ring-Down analyzers, (TD-CARDS) which may include Gated Integrated Detection (GID), preferably simultaneous gated integrated detection (SGID).

Nitrogen monoxide may be added to titrate peroxides generating nitrogen dioxide at temperatures between 50° C. and 300° C. Ozone may be added to titrate nitrogenous species such as ammonia or amines, generating nitrogen dioxide at temperatures between 100° C. and 300° C. Higher temperatures and/or catalysts could potentially make nitrogen monoxide which would need to be reacted with ozone to re-form nitrogen dioxide, as disclosed in U.S. Pat. No. 8,846,407, the contents of which are fully incorporated by reference herein.

In some embodiments, a basic chemical scrubber may be used to pass only bases and non-base reacting species. An acidic scrubber may be used to only pass acids and non-acid reacting species. Thermal decomposition can be utilized in parallel or series to isolate species that decompose at different temperatures. Power for the apparatus may be provided by rechargeable batteries, fuel cells, wireless power transmission, and/or the like. In some embodiments, power may be provided as mechanical energy stored in a spring or other mechanical means. Preferably, components of the device are dimensioned and arranged for drop in replacement, such as drying agent and automatic drainage of chiller containers.

Preferably, the samples are analyzed via SGID CRDS, which can provide nitrogen dioxide detection in the low parts per trillion (ppt) range as currently approached with GID. Accordingly, in embodiments the samples are captured from the ambient air and contained within the device, the samples are then reconstituted into air via thermal desorption and directed into a SGID CRDS analyzer. Optionally, the analysis samples are further treated and/or manipulated prior to analysis. Preferably, the analyzer is a cavity ring down measurement system comprising a light source in optical communication with a detector through an optical cavity; the detector in electronic communication through a gating circuit with a first integrating circuit and a second integrating circuit; the light source, the detector, the gating circuit, and the integrating circuits in electronic communication with a processing system; the processing system controlling the system, over an integrating period of time, repeatedly cycle the light source on in a light source on event to produce a plurality of individual ring up currents from the detector, each of the individual light source on events followed by a corresponding light source off event to produce a plurality of ring down currents from the detector; for each of the light source on and off events, over the integration period of time, a portion of each ring up current is directed by the gating means to the first integrating circuit followed by directing a portion of each ring down current to the second integrating circuit to produce a total ring up current comprising a sum of the plurality of ring up currents obtained during the integration time and a total ring down current comprising a sum of the plurality of ring down currents obtained during that same integration time.

Figure 1:
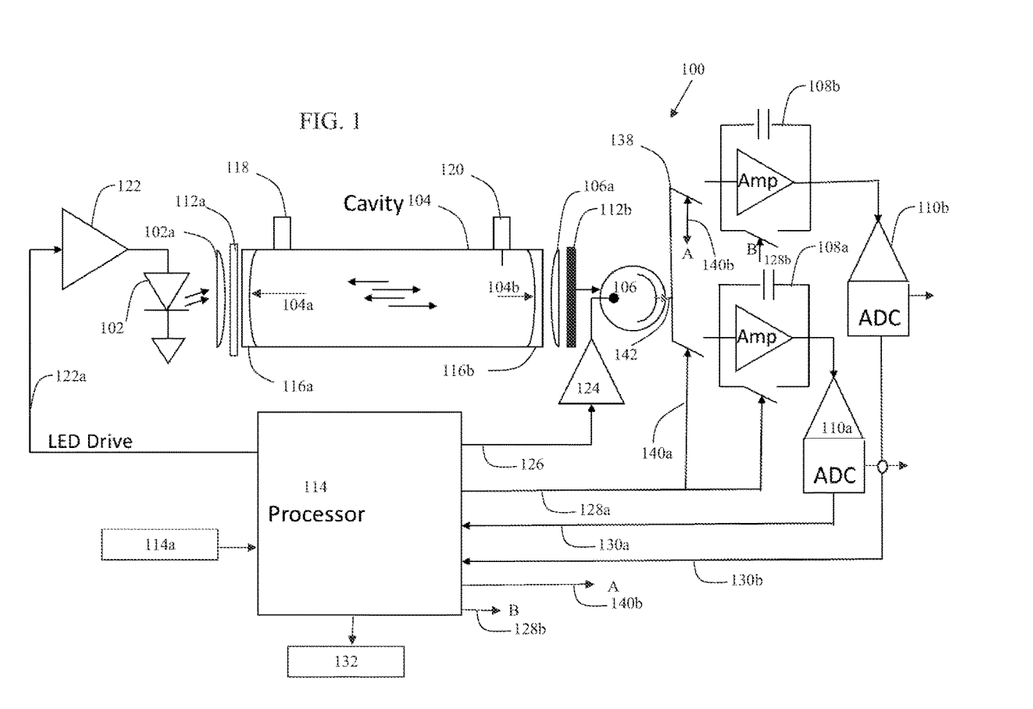
FIG. 1 shows a block diagram of a SGID-CRDS analyzer according to embodiments disclosed herein.

As shown in FIG. 1 in block diagram format, principle components of SGID-CRDS 100 generally include a light source 102, an optical cavity 104, a detector 106, a first integrator 108a, a second integrator 108b and a converter 110. Light source 102 with the aid of an associated lens or lenses 102a may be directed toward a proximal end 104a of optical cavity 104 while a distal end 104b of optical cavity 104 may be directed toward detector 106 with the aid of an associated lens 106a. In one embodiment, a bandpass filter 112a is positioned between light source 102 and proximal end 104a of optical cavity 104, and/or a bandpass filter 112a is positioned between distal end 104b of optical cavity 104 and detector 106 and/or proximate to the detector 112b. Detector 106 is in gated electrical communication through the switching circuitry 138, e.g., one or more field effect transistors, with integrators 108a and 108b. The integrators 108a and 108b are in electrical communication with the respective converter 110a and 110b. All components (i.e., light source 102, optical cavity 104, detector 106, integrators 108a and 108b, and converters 110a and 110b) are in electronic communication with and controlled and/or driven by a processing or controlling component, generally referred to in the figure as computer 114. An oscillator 114a may be utilized to provide a stable and accurate timing source for computer 114 instruction stepping and timing and, in turn, for the gated integration measurement intervals according to aspects disclosed herein.

The light escaping from distal end 104b of optical cavity 104 is focused on to detector 106 with the aid of lens 106a which in turn converts the photons from the light into electrons. Detector 106 collects the photons emitted from optical cavity 104 only when gated (i.e., driven ON by an amplified buffer 124). During a single ON-OFF event, portions of two separate measurements made. During a portion of the ON event, the output from the detector is directed, e.g., gated or switched into electrical communication 138 with a first integration circuit 108a. During this time the current 142 flowing from the detector 106 is integrated by integrator 108a. Immediately after the ON event the light source 102 is switched off by processor 114 to produce an OFF event. During a portion of the OFF event, the output of the detector 106 is directed through the gating circuit 138 to the second integrator 108b. The current 142 flowing from the detector 106 is then integrated by integrator 108b. A plurality of ON-OFF events are conducted during a single integration period of time. The sum of each of the currents from each of the portions of an ON event obtained during the integration time are integrated to produce an electronic signal which represents a total ring up time. The sum of each of the currents from each of the portions of an OFF event obtained during this same integration time are integrated to produce an electronic signal which represents a total ring down time. The gating circuit 138 is controlled by the processor 114 via communication links 140a and 140b. The sample time signal output (arrow 126) from computer 114 to detector 106 defines this gated detection time. Each ON event and OFF event produces a small current sample which is collected by integrators 108a and 108b. This process is repeated over, for example, ten-thousand to one hundred thousand times during a single integration period of time, (e.g., 10-100 μs ON-OFF cycle time over an integration period of time of about 0.1 to 1 second) which in turn creates a significant output voltage at integrators 108a and 108b. The output voltage is then measured by a corresponding converter 110a or 110b, each of which may be, for example, a high-resolution analog-to-digital converter. After the end of the previous measurement cycle (integration period of time) and before the beginning of the next measurement cycle, the integrators 108a and 108b and the corresponding circuitry may be reset (arrows 128a and 128b) by computer 114 and the initial output voltage of the integrators 108a and 108b may be measured by converters 110a and 110b, respectively, e.g., the initial output voltage of integrator 108a and 108b is measured between cycles. Measuring the initial output voltage of the integrator is more accurate than assuming the reset output voltage is "zero".

In one or more embodiments, the cavity ring down measurement system further comprises a first dual N-channel and dual P-channel MOSFET pair connected to the detector for receiving a first detection signal; a first operational amplifier having a positive input for receiving a first dual N-channel and dual P-channel MOSFET pair output signal and a negative input for receiving a first operational output signal and a second dual N-channel and dual P-channel MOSFET pair electrically connected to the first operational output signal; and wherein the second integrating circuit comprises: a third dual N-channel and dual P-channel MOSFET pair connected to the detector for receiving a second signal from the detector; a second operational amplifier having a positive input for receiving a third dual N-channel and dual P-channel MOSFET pair output signal and a negative input for receiving a second operational output signal; and a fourth dual N-channel and dual P-channel MOSFET pair electrically connected to the second operational output signal. As disclose in the application filed Dec. 8, 2019, with the same inventors as the instant application, the contents of which are fully incorporated by reference herein.

Furthermore, in embodiments the device utilizes an analysis method using a laser having a power output suitable to produce a factor of 4 improvement from 0.5 ppb of $NO_2$ to 120 ppt of $NO_2$ via SGID-CRDS, which for TNT results in a detection limit below 40 ppt. Reduction of systematic error may reduce that to near 75 ppt/2 seconds for $NO_2$, the photon limit with 25×improved mirrors which can produce a factor of 5 improvement. The simultaneous gated analysis further providing a factor of 2 improvement, along with a factor of 1.9 for the path-length and 1.5 intensity resulting in a factor of 2.3 improvement.

Figure 2:
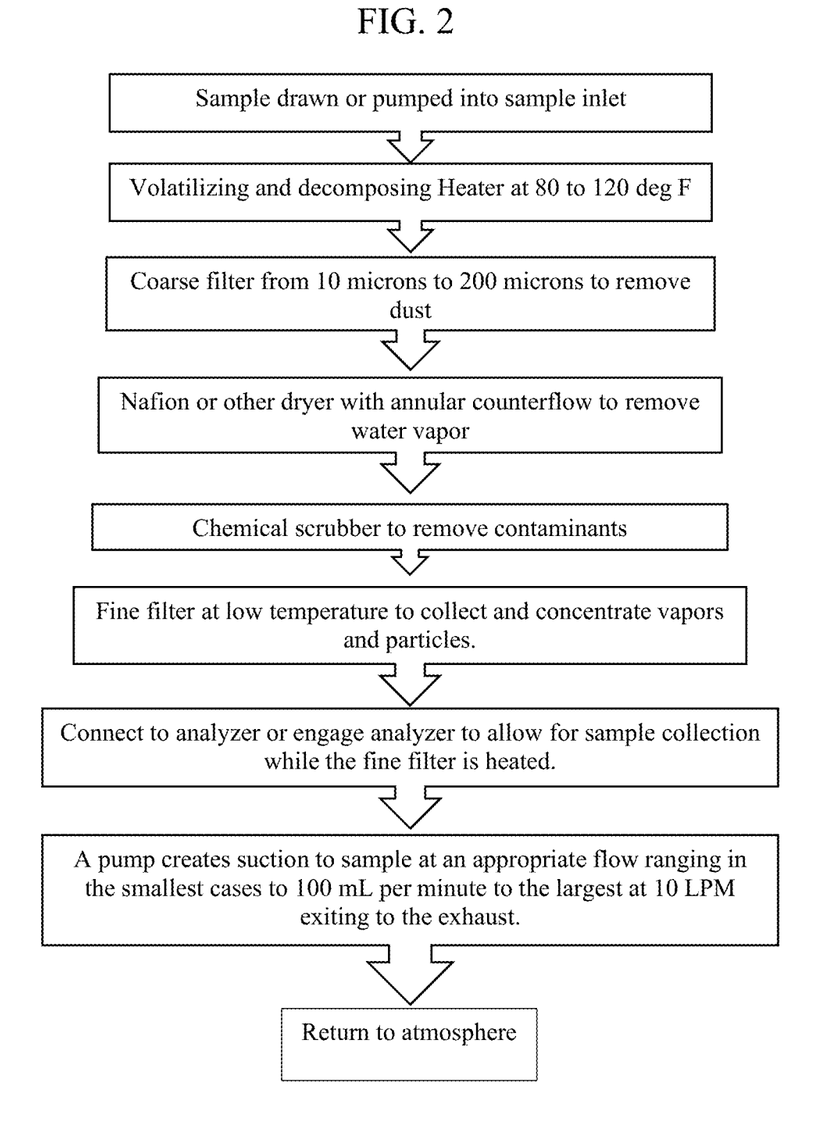
FIG. 2 shows a block diagram of the sample acquisition device and process.

FIG. 2 shows a block diagram of the sample acquisition device and process.

Figure 3:
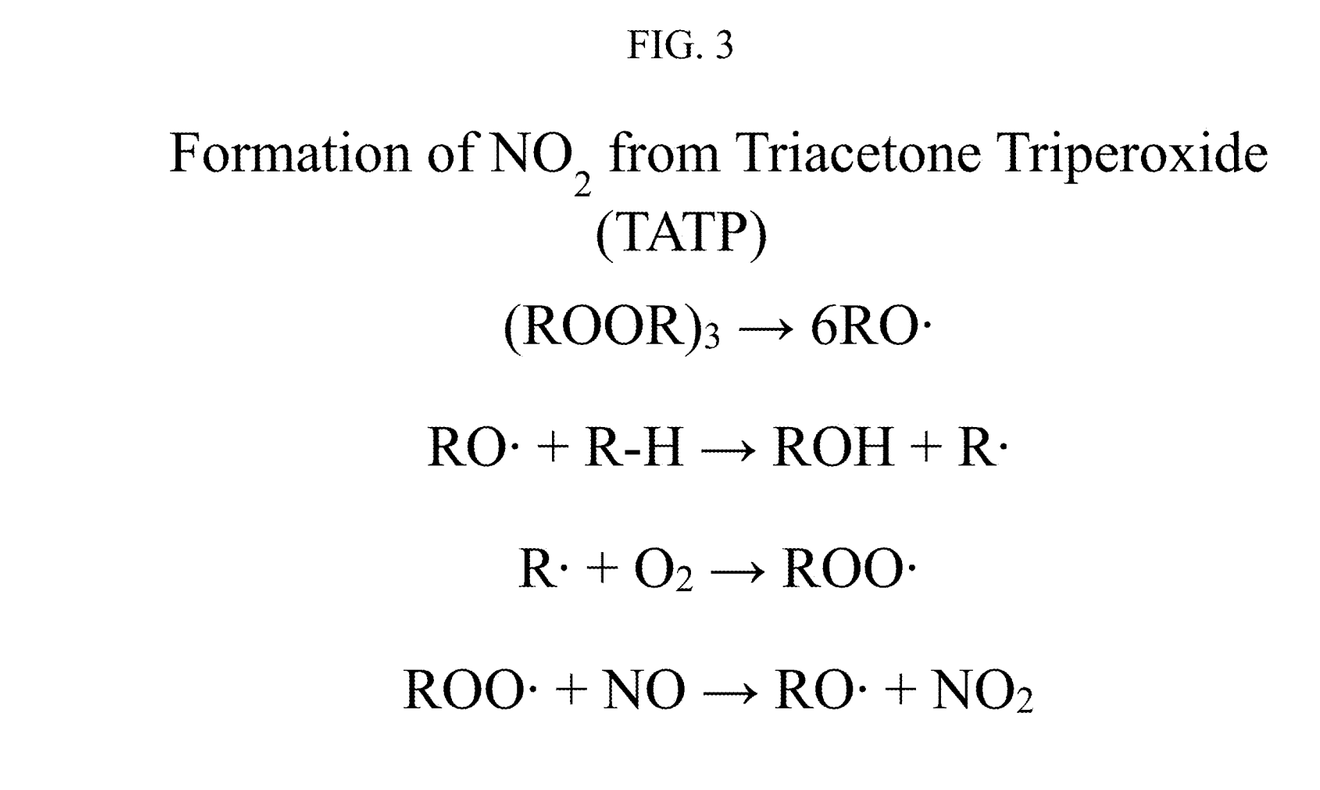
FIG. 3 shows the reactions which produce $NO_2$ suitable for cavity ring down analysis from triacetone triperoxide based explosives.

FIG. 3 shows the reactions which produce $NO_2$ suitable for cavity ring down analysis from triacetone triperoxide based explosives.

Figure 4:
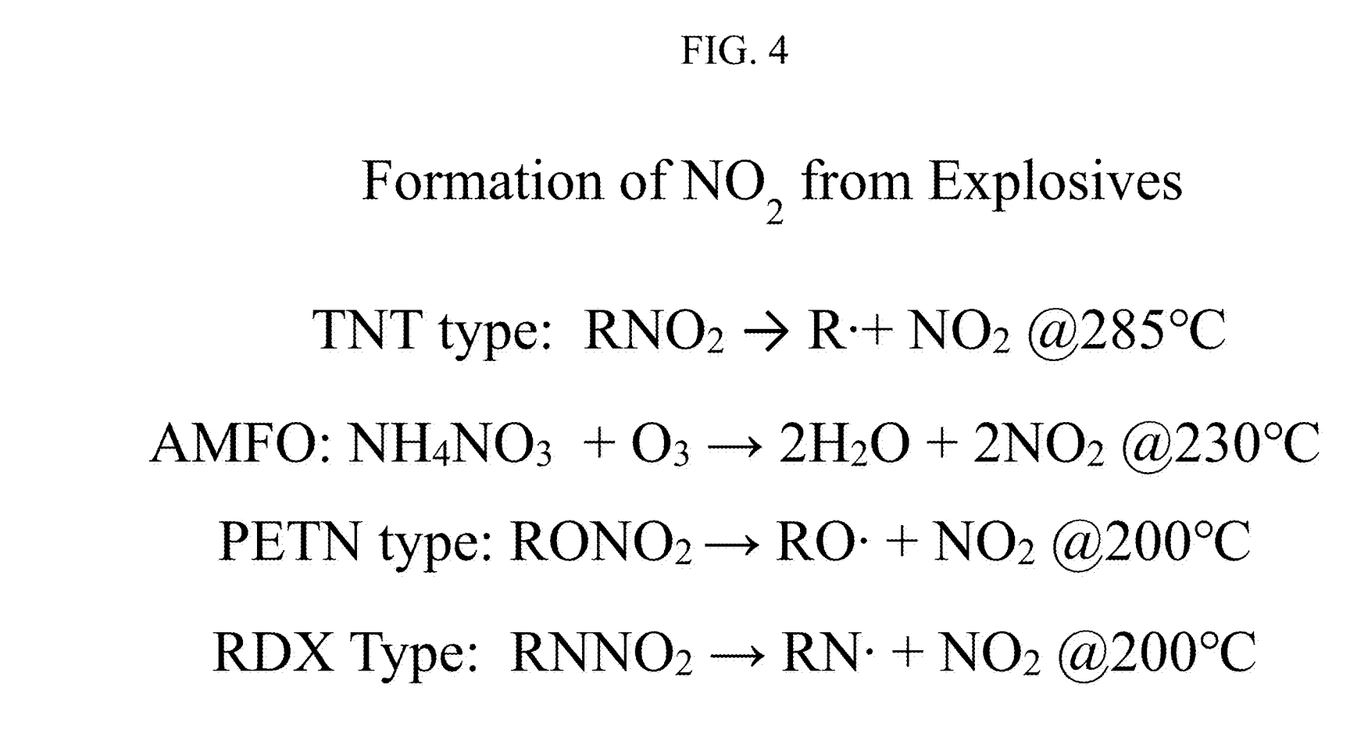
FIG. 4 shows the reactions of various type of explosives which produce $NO_2$ suitable for cavity ring down analysis.

FIG. 4 shows the reactions of various type of explosives which produce $NO_2$ suitable for cavity ring down analysis.

Figure 5:
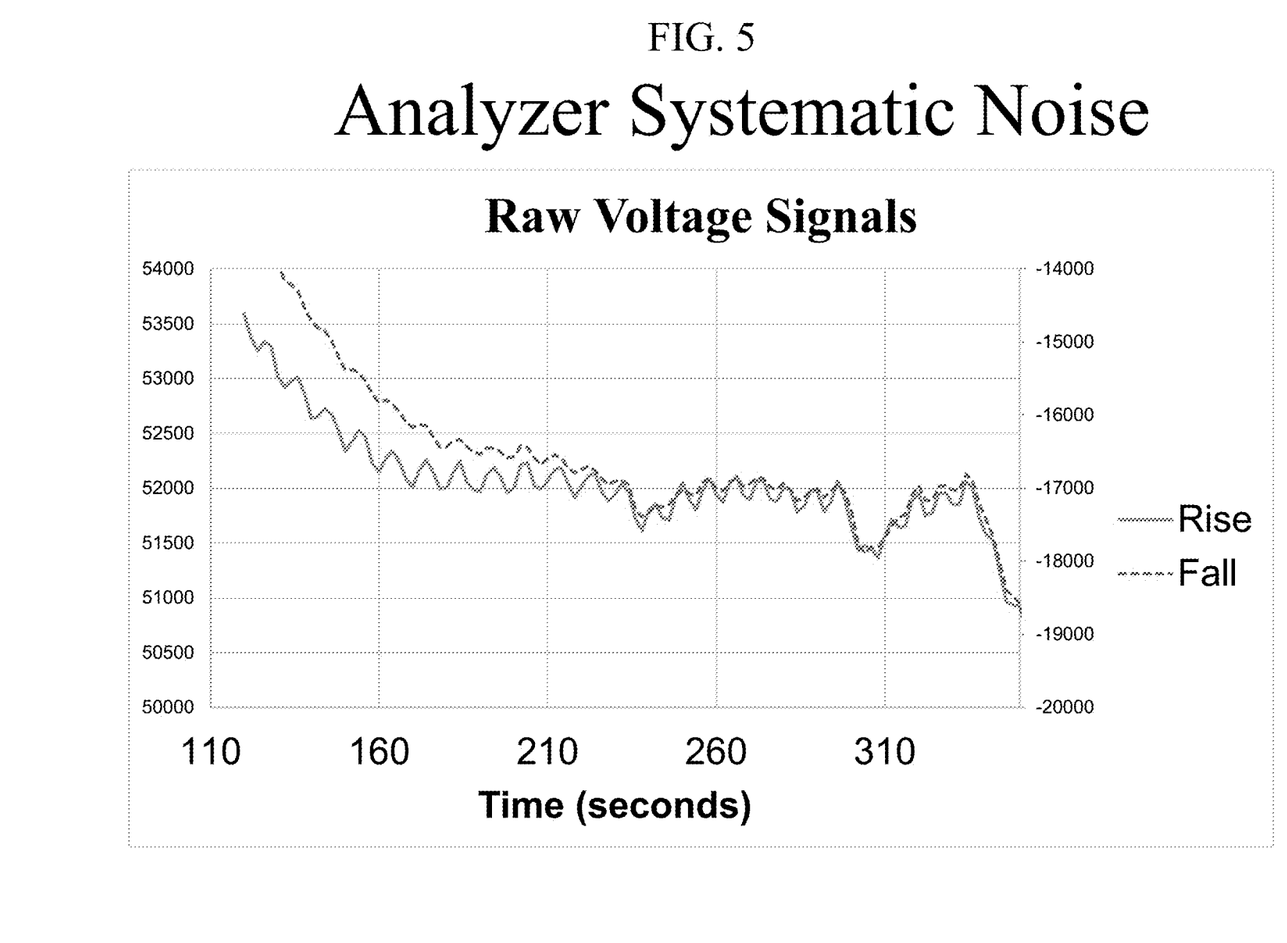
FIG. 5 shows raw voltage signals of samples acquired and then analyzed according to embodiments disclosed herein.
Figure 6:
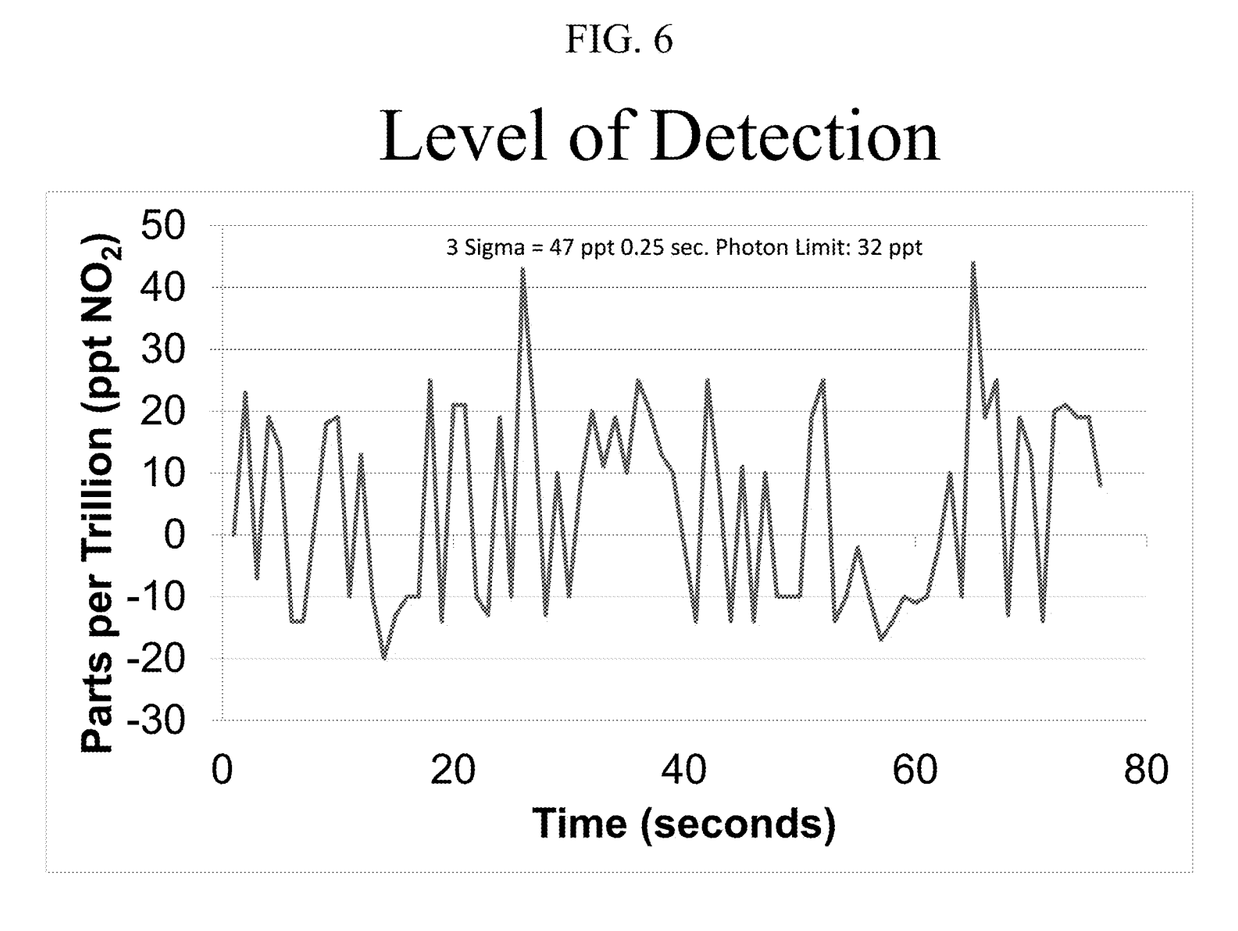
FIG. 6 shows the ppt detection limits obtained according to embodiments disclosed herein.

FIG. 5 shows raw voltage signals of samples acquired and then analyzed according to embodiments disclosed herein, and FIG. 6 shows the ppt detection limits obtained according to embodiments disclosed herein.

Accordingly, TD-CRDS converts the odor of explosives to air pollution and detects it at a level reduced from parts per billion (ppb) to parts per trillion (ppt).

Embodiments of the sampling devices disclosed herein are rugged enough for travel and demonstration. TD-CRDS can be used for selective identification.

For example, one of several roving samplers may encounter a "high value target." The outer defenses are stripped away with cutters and pliers. A warmed needle perforates the inner container. A sample is drawn past the water scrubber to the filter chiller and deposited at the chilled fine filter according to embodiments disclosed herein, the sampler returns or is returned for analysis at which time the analytes are desorbed and directed into the analyzer. Heat desorbs the TNT at with a temperature/rate profile specific to TNT. The TNT transits the heater to decompose at any temperature between 200 and 300 deg C. it generates 320 picolitres of $NO_2$ diluted in a stream of 1 mL of dry air. That creates a positive signal of 320 ppb total of $NO_2$ in the CRDS analyzer over a period of a few seconds. The target is identified.

In another example, a package is sampled similar to as described for TNT. A nanogram of fentanyl is vaporized and passes the warm coarse filter. The fentanyl is dried by the Nafion Dryer. The fentanyl passes a pH basic scrubber, leaving behind any HCl residue. The fentanyl is trapped on the filter at low temperature. The fentanyl is desorbed with a characteristic thermal desorption profile when engaged with the analyzer. The fentanyl is reacted with ozone in a heater between 100 deg C and 300 deg C. Different species will work at a specific threshold which can be diagnostic. The heater converts the Fentanyl to 150 picolitres of $NO_2$. In 1 mL of dry air, the $NO_2$ is detected by SGID-CRDS-GID as a total of 150 ppb of $NO_2$ over a few seconds. The limit of detection is in the parts per trillion (ppt). The target is identified.

Embodiment Listing

The instant disclosure is further directed to one or more aspects and/or embodiments according to the following.

E1. A device comprising:
- (a) a sample inlet for receiving an air sample from an ambient environment, in fluid communication with;
- (b) a first filter dimensioned to remove particulates greater than about 10 microns, from the air sample obtained from the ambient environment, in fluid communication with
- c) a dryer active to remove water vapor present in the air sample, in fluid communication with
- d) a chemical scrubber active to remove contaminants from the air sample, in fluid communication with
- e) a cold trap, maintained at a temperature sufficient to retain analytes present in the air sample prior to a remainder of the air sample being exhausted through a sample outlet to the ambient environment, wherein an outlet of the cold trap is configured to be put into fluid communication with an inlet of a spectroscopic analyzer such that analytes present in the cold trap may be released from the cold trap and analyzed.

E2. The device according to Embodiment E1, further comprising an air pump, an outlet of the air pump in direct fluid communication with the sample inlet such that the air sample is pumped through the device from the sample inlet to the sample outlet.

E3. The device according to Embodiment E1, further comprising an air pump, an inlet of the air pump in direct fluid communication with the sample outlet such that the air sample is drawn through the device from the sample inlet to the sample outlet.

E4. The device according to any one of Embodiments E1 through E3, wherein the sample inlet, the first filter, or both are heated to a temperature sufficient to decompose sources of interference to the analysis.

E5. The device according to any one of Embodiments E1 through E4, wherein the sample inlet, the first filter, or both are heated to a temperature from about 30° C. to about 50° C. to decompose ambient alkyl peroxy-nitrates (PANs) known to interfere with cavity ring down spectroscopic analysis.

E6. The device according to any one of Embodiments E1 through E, wherein the dryer comprises a desiccant, a water permeable membrane, a thermal condensation dryer, or a combination thereof, suitable to lower a dew point of the air sample to about −10° C. or lower.

E7. The device according to any one of Embodiments E1 through E6, wherein the chemical scrubber comprises a pH basic absorbent, a pH basic adsorbent, a pH acidic absorbent, a pH acidic adsorbent, a humectant, or a combination thereof, sufficient to remove compounds known to interfere with the analysis.

E8. The device according to any one of Embodiments E1 through E7, wherein the chemical scrubber comprises glycerin.

E9. The device according to any one of Embodiments E1 through E8, wherein the cold trap comprises one or more porous surfaces in thermal communication with a cooling surface.

E10. The device according to any one of Embodiments E1 through E9, wherein the cold trap comprises a thermoelectric cooler.

E11. The device according to any one of Embodiments E1 through E10, wherein the cold trap is cooled with an ice bath, solid carbon dioxide, liquid nitrogen, or a combination thereof.

E12. The device according to any one of Embodiments E1 through E11, wherein the cold trap further comprises a heater, controllable to remove trapped analytes for the spectroscopic analysis.

E13. The device according to any one of Embodiments E1 through E12, wherein the sample inlet is upstream of the first filter; the first filter is upstream of the dryer; the dryer is upstream of the chemical scrubber, or a combination thereof.

E14. The device according to any one of Embodiments E1 through E13, wherein the spectroscopic analyzer includes a cavity ring down spectroscopic analyzer.

E15. The device according to any one of Embodiments E1 through E16, wherein the spectroscopic analyzer includes a cavity ring down spectroscopic analyzer comprising a thermal desorption cavity ring down spectrometer (TD-CRDS), a cavity attenuated ring down spectrometer with gated integrated detection (CARDS-GID), a cavity phase shift spectrometer (CAPS), a cavity enhanced absorption (CEAS) spectrometer, a laser-induced fluorescence detector (LIF) spectrometer, a simultaneous gated integrated detection cavity ring down spectrometer (SGID-CRDS), or a combination thereof.

E16. A method comprising:
- (i) collecting an air sample from an ambient environment by directing the air sample from the sample inlet to the sample outlet of the device according to any one of Embodiments E1 through E15;
- ii) trapping one or more analytes present in the air sample within the cold trap to form an analysis sample;
- iii) placing the outlet of the cold trap in fluid communication with the inlet of the spectroscopic analyzer;
- iv) heating the cold trap to release the analytes from in the cold trap present in the analysis sample; and
- v) analyzing the analysis sample using the spectroscopic analyzer.

E17. A method comprising:
- (i) collecting an air sample from an ambient environment by directing the air sample from a sample inlet to a sample outlet, the device comprising:
  - (a) the sample inlet in fluid communication with;
  - (b) a first filter dimensioned to remove particulates greater than about 10 microns, from the air sample obtained from the ambient environment, in fluid communication with c) a dryer active to remove water vapor present in the air sample, in fluid communication with
d) a chemical scrubber active to remove contaminants from the air sample, in fluid communication with
e) a cold trap, maintained at a temperature sufficient to retain analytes present in the air sample prior to a remainder of the air sample being exhausted through a sample outlet to the ambient environment, wherein an outlet of the cold trap is configured to be put into fluid communication with an inlet of a spectroscopic analyzer such that analytes present in the cold trap may be released from the cold trap and analyzed;
ii) trapping one or more analytes present in the air sample within the cold trap to form an analysis sample;
iii) placing the outlet of the cold trap in fluid communication with the inlet of the spectroscopic analyzer;
iv) heating the cold trap to release the analytes from in the cold trap present in the analysis sample; and
v) analyzing the analysis sample using the spectroscopic analyzer.

E18. The method according to Embodiment E16 or E17, wherein the heating of the cold trap comprises a controlled thermal desorption of the analysis sample to produce a plurality of thermal desorption analysis samples characterized by a desorption temperature during the analyzing of the analysis sample.

E19. The method according to any one of Embodiments E16 through E18, wherein the spectroscopic analyzer includes a cavity ring down spectroscopic analyzer.

E20. The method according to any one of Embodiments E16 through E19, wherein the spectroscopic analyzer includes a cavity ring down spectroscopic analyzer comprising a thermal desorption cavity ring down spectrometer (TD-CRDS), a cavity attenuated ring down spectrometer with gated integrated detection (CARDS-GID), a cavity phase shift spectrometer (CAPS), a cavity enhanced absorption (CEAS) spectrometer, a laser-induced fluorescence detector (LIF) spectrometer, a simultaneous gated integrated detection cavity ring down spectrometer (SGID-CRDS), or a combination thereof.

E21. A device comprising:
a sampling device according to any one of Embodiments E1 through E15, in fluid communication with a cavity ring down spectroscopic analyzer comprising a thermal desorption cavity ring down spectrometer (TD-CRDS), a cavity attenuated ring down spectrometer with gated integrated detection (CARDS-GID), a cavity phase shift spectrometer (CAPS), a cavity enhanced absorption (CEAS) spectrometer, a laser-induced fluorescence detector (LIF) spectrometer, a simultaneous gated integrated detection cavity ring down spectrometer (SGID-CRDS), or a combination thereof, having the analyzer inlet configured to be put in fluid communication with the outlet of the cold trap.

E22. A device comprising:
(a) a sample inlet for receiving an air sample from an ambient environment in fluid communication with;
(b) a first filter dimensioned to remove particulates greater than about 10 microns from air sample, in fluid communication with
c) a dryer active to remove water vapor present in the air sample, in fluid communication with
d) a chemical scrubber active to remove contaminants from the air sample, in fluid communication with
e) a cold trap, maintained at a temperature sufficient to precipitate and capture analytes present in the air sample prior to the air sample being exhausted through a sample outlet to the ambient environment, wherein an outlet of the cold trap is configured to be put into fluid communication with an analyzer inlet of a cavity ring down spectroscopic analyzer such that analytes present in the cold trap may be released from the cold trap and analyzed; and
f) a cavity ring down spectroscopic analyzer comprising a thermal desorption cavity ring down spectrometer (TD-CRDS), a cavity attenuated ring down spectrometer with gated integrated detection (CARDS-GID), a cavity phase shift spectrometer (CAPS), a cavity enhanced absorption (CEAS) spectrometer, a laser-induced fluorescence detector (LIF) spectrometer, a simultaneous gated integrated detection cavity ring down spectrometer (SGID-CRDS), or a combination thereof, having the analyzer inlet configured to be put in fluid communication with the outlet of the cold trap.

While certain exemplary embodiments have been described and shown in the accompanying drawings, it is to be understood that such embodiments are merely illustrative of and not restrictive on the broad aspects disclosed herein, and that the aspects disclosed herein are not be limited to the specific constructions and arrangements shown and described, since various other modifications may occur to those ordinarily skilled in the art.

The instant description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of:" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

I claim:
1. A device comprising:
(a) a sample inlet for receiving an air sample from an ambient environment, in fluid communication with;
(b) a first filter dimensioned to remove particulates greater than about 10 microns, from the air sample obtained from the ambient environment, in fluid communication with
c) a dryer active to remove water vapor present in the air sample, in fluid communication with
d) a chemical scrubber active to remove contaminants from the air sample, in fluid communication with
e) a cold trap, maintained at a temperature sufficient to retain analytes present in the air sample prior to a remainder of the air sample being exhausted through a sample outlet to the ambient environment, wherein an outlet of the cold trap is configured to be put into fluid communication with an inlet of a spectroscopic analyzer such that analytes present in the cold trap may be released from the cold trap and analyzed; wherein the spectroscopic analyzer comprises a light source in optical communication with a detector through an optical cavity;

the detector in electronic communication through a gating circuit with a first integrating circuit and a second integrating circuit;

the light source, the detector, the gating circuit, and the integrating circuits in electronic communication with a processing system;

the processing system configured, over an integrating period of time, to repeatedly cycle the light source on in a light-source-on event to produce a plurality of individual ring up currents from the detector, each of the individual light-source-on events followed by a corresponding light-source-off event to produce a plurality of ring down currents from the detector;

for each of the light-source-on events, over the integration period of time, a portion of each ring up current is directed by the gating circuit to the first integrating circuit to produce a total ring up current including a sum of the plurality of ring up currents obtained during the integration time;

for each of the light-source-off events, over the integration period of time, a portion of each ring down current is directed by the gating circuit to the second integrating circuit to produce a total ring down current including a sum of the plurality of ring down currents obtained during that same integration time.

2. The device of claim 1 further comprising an air pump, an outlet of the air pump in direct fluid communication with the sample inlet such that the air sample is pumped through the device from the sample inlet to the sample outlet.

3. The device of claim 1 further comprising an air pump, an inlet of the air pump in direct fluid communication with the sample outlet such that the air sample is drawn through the device from the sample inlet to the sample outlet.

4. The device according to claim 1, wherein the sample inlet, the first filter, or both are heated to a temperature sufficient to decompose sources of interference to the analysis.

5. The device according to claim 1, wherein the sample inlet, the first filter, or both are heated to a temperature from about 30° C. to about 50° C. to decompose ambient alkyl peroxy-nitrates (PANs) known to interfere with cavity ring down spectroscopic analysis.

6. The device according to claim 1, wherein the dryer comprises a desiccant, a water permeable membrane, a thermal condensation dryer, or a combination thereof, suitable to lower a dew point of the air sample to about −10° C. or lower.

7. The device according to claim 1, wherein the chemical scrubber comprises a pH basic absorbent, a pH basic adsorbent, a pH acidic absorbent, a pH acidic adsorbent, a humectant, or a combination thereof, sufficient to remove compounds known to interfere with the analysis.

8. The device according to claim 7, wherein the chemical scrubber comprises glycerin.

9. The device according to claim 1, wherein the cold trap comprises one or more porous surfaces in thermal communication with a cooling surface.

10. The device according to claim 1, wherein the cold trap comprises a thermoelectric cooler.

11. The device according to claim 1, wherein the cold trap is cooled with an ice bath, solid carbon dioxide, liquid nitrogen, or a combination thereof.

12. The device according to claim 1, wherein the cold trap further comprises a heater, controllable to remove trapped analytes for the spectroscopic analysis.

13. The device of claim 1, wherein the sample inlet is upstream of the first filter;

the first filter is upstream of the dryer; the dryer is upstream of the chemical scrubber, or a combination thereof.

14. The device according to claim 1, wherein the spectroscopic analyzer includes a cavity ring down spectroscopic analyzer.

15. A method comprising:
(i) collecting an air sample from an ambient environment by directing the air sample from a sample inlet to a sample outlet, the device comprising:
(a) the sample inlet in fluid communication with;
(b) a first filter dimensioned to remove particulates greater than about 10 microns, from the air sample obtained from the ambient environment, in fluid communication with
c) a dryer active to remove water vapor present in the air sample, in fluid communication with
d) a chemical scrubber active to remove contaminants from the air sample, in fluid communication with
e) a cold trap, maintained at a temperature sufficient to retain analytes present in the air sample prior to a remainder of the air sample being exhausted through a sample outlet to the ambient environment, wherein an outlet of the cold trap is configured to be put into fluid communication with an inlet of a spectroscopic analyzer such that analytes present in the cold trap may be released from the cold trap and analyzed;
ii) trapping one or more analytes present in the air sample within the cold trap to form an analysis sample;
iii) placing the outlet of the cold trap in fluid communication with the inlet of the spectroscopic analyzer;
iv) heating the cold trap to release the analytes from in the cold trap present in the analysis sample; and
v) analyzing the analysis sample using the spectroscopic analyzer;

wherein the spectroscopic analyzer comprises a light source in optical communication with a detector through an optical cavity;

the detector in electronic communication through a gating circuit with a first integrating circuit and a second integrating circuit;

the light source, the detector, the gating circuit, and the integrating circuits in electronic communication with a processing system;

the processing system configured, over an integrating period of time, to repeatedly cycle the light source on in a light-source-on event to produce a plurality of individual ring up currents from the detector, each of the individual light-source-on events followed by a corresponding light-source-off event to produce a plurality of ring down currents from the detector;

for each of the light-source-on events, over the integration period of time, a portion of each ring up current is directed by the gating circuit to the first integrating circuit to produce a total ring up current including a sum of the plurality of ring up currents obtained during the integration time;

for each of the light-source-off events, over the integration period of time, a portion of each ring down current is directed by the gating circuit to the second integrating circuit to produce a total ring down current including a sum of the plurality of ring down currents obtained during that same integration time.

16. The method of claim 15, wherein the heating of the cold trap comprises a controlled thermal desorption of the analysis sample to produce a plurality of thermal desorption analysis samples characterized by a desorption temperature during the analyzing of the analysis sample.

17. A device comprising:
(a) a sample inlet for receiving an air sample from an ambient environment in fluid communication with;
(b) a first filter dimensioned to remove particulates greater than about 10 microns from air sample, in fluid communication with
c) a dryer active to remove water vapor present in the air sample, in fluid communication with
d) a chemical scrubber active to remove contaminants from the air sample, in fluid communication with
e) a cold trap, maintained at a temperature sufficient to precipitate and capture analytes present in the air sample prior to the air sample being exhausted through a sample outlet to the ambient environment, wherein an outlet of the cold trap is configured to be put into fluid communication with an analyzer inlet of a cavity ring down spectroscopic analyzer such that analytes present in the cold trap may be released from the cold trap and analyzed; and
f) a cavity ring down spectroscopic analyzer comprising a light source in optical communication with a detector through an optical cavity;
the detector in electronic communication through a gating circuit with a first integrating circuit and a second integrating circuit;
the light source, the detector, the gating circuit, and the integrating circuits in electronic communication with a processing system;
the processing system configured, over an integrating period of time, to repeatedly cycle the light source on in a light-source-on event to produce a plurality of individual ring up currents from the detector, each of the individual light-source-on events followed by a corresponding light-source-off event to produce a plurality of ring down currents from the detector;
for each of the light-source-on events, over the integration period of time, a portion of each ring up current is directed by the gating circuit to the first integrating circuit to produce a total ring up current including a sum of the plurality of ring up currents obtained during the integration time;
for each of the light-source-off events, over the integration period of time, a portion of each ring down current is directed by the gating circuit to the second integrating circuit to produce a total ring down current including a sum of the plurality of ring down currents obtained during that same integration time; and
having the analyzer inlet configured to be put in fluid communication with the outlet of the cold trap.

* * * * *